INVENTORS
Joseph E. Mailhos
Gerald P. Delaune

George H. Baldwin
Attorney 3,666,619
KRAFT PULP AND PAPER RECOVERY PROCESS
Joseph E. Mailhos and Gerald P. Delaune, Elizabeth, La., assignors to Calcasieu Paper Company, Inc., Elizabeth, La.
Filed Apr. 8, 1969, Ser. No. 814,343
Int. Cl. D21c 11/12
U.S. Cl. 162—30                12 Claims

ABSTRACT OF THE DISCLOSURE

Waste effluents from a kraft plant are reduced by reclaiming colored liquors, white water and weak liquor sewer waters by separate procedures that are preferably integrated. Effluent colored liquors, such as evaporator condensate, blow heat condensate, and pulp decker filtrate are treated in a clarifier with calcium carbonate as a flocculating aid to settle out colloidal material and the clarifier underflow is passed to the lime mud filter cake for subsequent burning in the lime kiln. The clarified liquor is returned to the process for use as scrub waters in a recovery furnace gas scrubber and in the primary and secondary lime kiln gas scrubbers, and the underflow from the primary scrubber is used as a source of calcium carbonate in the clarifier. The white water is isolated from the plant sewer system and also treated in a clarifier with calcium carbonate. In this case, the underflow from the secondary scrubber serves as a calcium carbonate source. The clarified white water is then filtered and subsequently passed through a cation exchange unit so that it can be then used as fresh water in the kraft plant. Weak liquor from the plant sewer system is also isolated and after collection in a pond is returned as wash water to an intermediate stage in the multistage pulp washing unit. A portion of the effluent from the cation exchange unit is heated in a blow heat recovery unit and subsequently used as fresh wash water in the last stage of the washing unit while the underflow from the recovery furnace gas scrubber is used as wash water in the lime mud washer.

---

Figure 1:
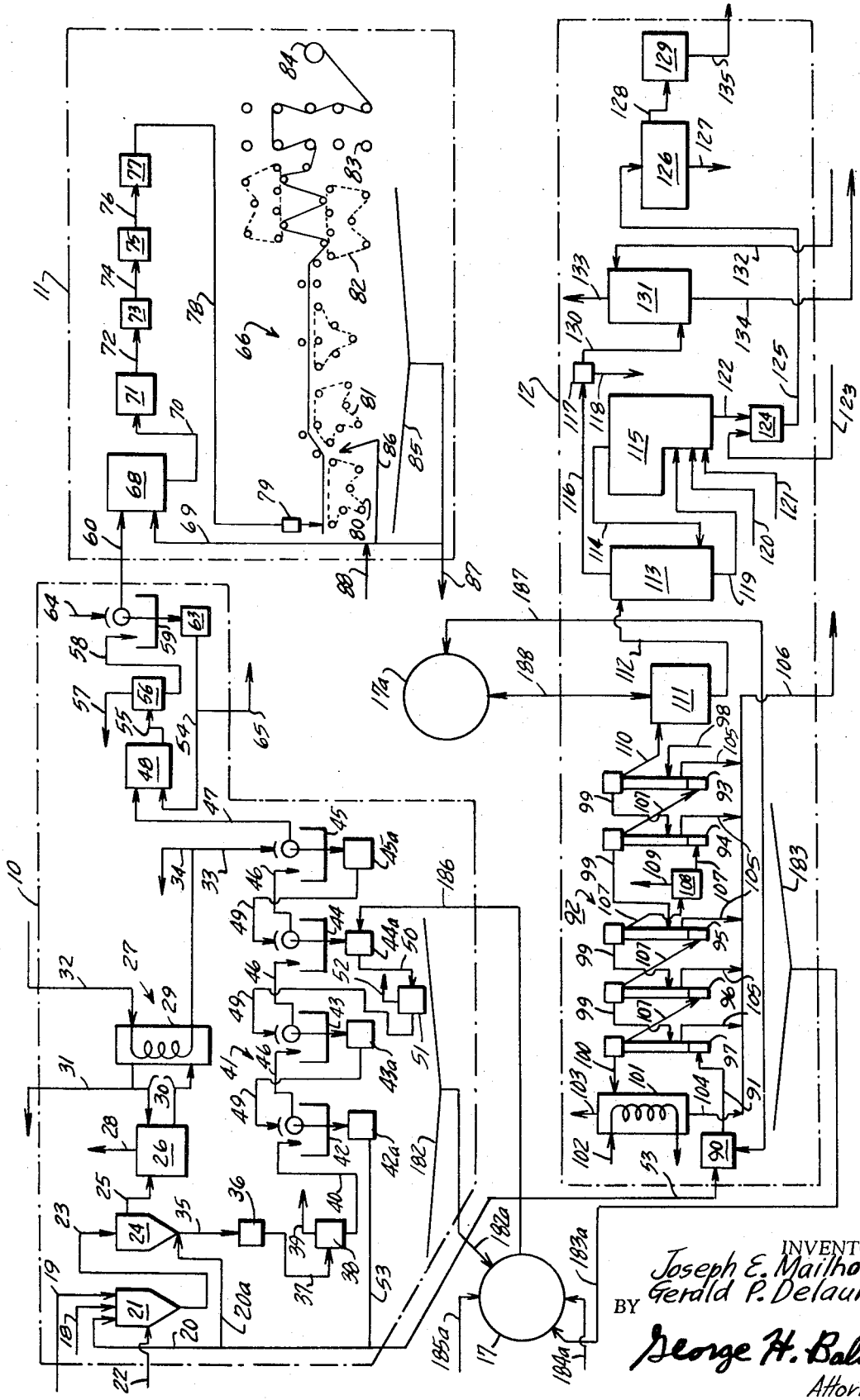

The invention relates to the reclamation of waste effluents from kraft pulp and paper process plants and which normally contaminate adjacent bodies of water and is particularly directed to reclamation procedures which enables recovery of the aqueous and chemicals values and their reuse in the plant process.

Those familiar with kraft pulp and paper process plants are aware of the contaminating effects of discharging the waste aqueous effluents from the plant process into local bodies of water. These effluents contain substantial amounts of biologically degradable matter which in degrading in the local body of water rapidly taxes the sources of oxygen which is otherwise available to plant and animal life in the streams, rivers and other water bodies in the vicinity of the plant. In addition to the adverse effect on local plant and animal life, some of the effluents are highly colored and hence contribute to unsightly conditions in the local water bodies.

Waste aqueous effluent from kraft pulp and paper process plants generally fall into three categories as follows: (1) The white water which is bled-off from the white water sewer system in the paper mill and which contains suspended pulp, sizing compounds and other solids which are biologically degradable. (2) The highly colored liquor effluents which contain large amounts of dissolved lignin and other suspended material and which also contain chemical values that constitute chemical losses in a kraft process. These colored liquor effluents include the blow heat condensate which is bled-off from the blow heat recovery unit, the evaporator condensates from the multiple effect evaporation unit, and the bleed-off from the pulp decker filtrate system. The contamination of the condensates is caused principally by black liquor entrainment which is inherent in the operation of the equipment involved in the blow heat recovery unit and the multiple effect evaporation unit whereas the pulp decker filtrate is contaminated by the residual black liquor contained in the pulp derived from the washing unit. (3) The weak liquor from the plant weak liquor sewer system that service the pulp mill system, the soda recovery system, the lime recovery system and the chemical production system in the plant operation.

The waste effluent itemized above are, in usual plant practice, discharged as wastes directly to the local water body and in addition to these wastes there are occasions which arise when liquors that are even more contaminating are discharged in the local water body. Thus it frequently happens that the need arises to shut down the recovery furnace or the multiple effect evaporator unit. Under such circumstances, it is not uncommon in kraft pulp and paper plants that have inadequate facilities for storing black and heavy liquors to pass the excesses into the plant effluent system.

Various methods have been advocated to reduce the oxygen demand in the local water bodies including pre-oxidation treatments of the effluents prior to their release from the kraft plant. Although such treatments are useful, and in some instances have been so integrated into the kraft pulp and paper processing plant, as to reduce the need for make up fresh water in certain areas of the plant, they nevertheless provide a plant effluent which still contains biologically degradable matter and/or values which constitute chemical losses from the plant process. In other cases, speciality treatments have been advocated for selected waste effluents and which permit recovery of the chemical values and the reuse of the aqueous effluents in the kraft process. These methods, as currently proposed however, are so costly as to render their use in kraft process plants impractical from an economical viewpoint.

A general object of the invention is to provide improvements in kraft process plants and which are designed to facilitate the reclamation of one or more of the waste effluents and so that the need for discharging the effluent to the local body of water is avoided.

One particular object of the invention is to provide a process for reclaiming the highly colored liquors and which enables the reintroduction into the plant process of both the chemicals and aqueous values which are recovered in the reclamation process.

A still further object of the invention is to provide a process for reclaiming the white waters that are normally discharged as waste effluents from the kraft process plant and which is more economical and more readily adaptable to kraft pulp and paper process operations than the massive lime treatment procedures that are currently being advocated by the industry.

Yet other objects of the invention are directed to providing procedures for recovering colored liquors and white water in kraft pulp and paper process plants and which are so integrated with each other and with certain operations in the kraft plant as to render the recovery of the effluents economically feasible and thus avoid the need for discharging the effluents as waste into local water bodies.

Yet another object of the invention is to provide a method for reclaiming the weak liquor that is derived from the plant sewer system and in a manner such as to reduce the consumption of fresh water in the plant process.

Yet another object of the invention is to provide improved procedures for kraft pulp and paper process plants and which are directed to eliminating the discharge to local water bodies of such waste effluents as the colored liquors, the white waters and the weak liquors derived from the plant sewer system.

Still other objects will be apparent from the disclosure which follows.

In accord with one aspect of the invention we have found that the color and high biological oxygen demand content of such waste effluent colored liquors as the blow heat condensate, the pulp decker filtrate, and the evaporator condensate can be appreciably reduced by treating the colored liquor with calcium carbonate and clarifying the treated liquor by settling procedures. The calcium carbonate serves as an aid to the flocculation of the colloidal particles in the colored liquor and surprisingly it has been found that upon separation of the flocculated particles from the resultant clarified liquor that there is an appreciable reduction in the color of the treated liquor.

In treating the effluent colored liquor, the calcium carbonate is employed in a weight ratio of $CaCO_3$ to BOD value of the liquor between 20:1 and 80:1 and under optimum conditions it is preferably used in a weight ratio of between 30:1 and 50:1. When the amount of calcium carbonate employed as an aid to flocculation falls below a weight ratio of 20:1 the amount of clarification equipment required to carry out the settling procedures becomes excessive and uneconomical and the separation efficiency in conventional clarification equipment is not appreciably increased when the amount of calcium carbonate employed exceeds a weight ratio of 80:1.

In plant practice the calcium carbonate used in the treatment of the colored liquors along with other chemical values which are separated from the treated liquor are recovered by passing the underflow from the clarifier used in the settling procedure to the lime recovery system of the kraft plant and whereat the colloidal particles which are separated from the treated liquor are ultimately burned in the lime kiln of the lime recovery system. In passing the underflow from the clarifier to the lime recovery system it has been found preferable to introduce the underflow at a lime mud filter and as a spray directed onto the filter cake in the filter. In practice, it has been found that the introduction of the underflow into the mud washer is not feasible because of the colloidal nature of the particles involved. Such attempts have been unsuccessful because the colloidal particles apparently disrupt the settling procedures which transpire in the lime washers and thickeners of the lime recovery system. As an alternative to introducing the underflow from the clarifier involved in the colored liquor reclamation procedures, the underflow may be introduced directly into the lime kiln although this is less satisfactory than introducing the underflow in the lime mud filter because of the evaporation load which is added to the operation of the lime kiln.

In practice the clarified liquor which results from the treatment and subsequent clarification of the colored liquor is admirably suited for use as scrub water in the lime kiln gas scrubbers and also as scrub water for use in scrubbing the combustion gases derived from the soda recovery furnace. The underflows from the lime kiln gas scrubbers as well as the underflow from the recovery furnace gas scrubber may under such circumstances be returned to the lime recovery system as wash water to a lime mud washer so that the chemical values recovered by the scrubbing procedures may be recovered.

Calcium carbonate from any suitable source may be used as an aid to the flocculation of the colloidal particles in the colored liquors but in practice it has been found that in integrating the process into kraft process plant operations that the calcium carbonate containing scrub water in the underflow from the primary lime kiln gas scrubber can be effectively used in treating the colored liquors by simply mixing the calcium carbonate containing scrub water with the colored liquor to be subjected to the settling procedures.

Those skilled in the art will appreciate the fact that by using the calcium carbonate treated and clarified colored liquor for scrubbing the combustion gases derived from the lime kiln and recovery furnace, a considerable reduction in the amount of fresh water used in a kraft plant is realized and will also appreciate the fact that the procedures advocated for reclaiming the colored liquors may be used in reclaiming all or only a portion of the total colored liquor in the effluent from a kraft plant. In practice the amount of colored liquor which may be reclaimed in a kraft process plant will normally exceed the amount of scrubber underflow that may be passed to the lime recovery system without excessively diluting the product of the chemical production system and hence any excess gas scrubber underflow which can not be efficiently handled in the lime recovery system without causing excessive dilution of the product in the chemical production system of the kraft process may be suitably treated to reduce its hardness and thereafter used as fresh water in other areas of the plant process.

Yet another aspect of the invention has to do with the reclamation of the white water which is bled-off from the white water sewer system in the paper mill and which in most plants is normally discharged as a waste effluent from the plant process. In accord with this aspect of the invention it has been found that calcium carbonate serves as an aid to the flocculation of suspended solids in the white water and can be used in aiding the separation of the suspended particles from the white water by settling procedures. This is somewhat surprising since heretofore the industry has been advocating the use of lime for this purpose as opposed to the less expensive carbonate salt.

In general we have found that calcium carbonate from any suitable source may be used in treating the white water and that the settling procedures can be efficiently carried out in conventional clarification equipment by treating the white water with the calcium carbonate in the weight ratio of $CaCO_3$ to suspended solid in the white water of between 0.5:1 and 10:1 with optimum results being realized when the amount of calcium carbonate used in the treatment is such as to provide a weight ratio of $CaCO_3$ to the suspended solids of between 3:1 and 7:1.

The resulting clarified liquor in accord with the white water reclamation procedure is then filtred to remove residual suspended material and the filtrate is then subjected to a suitable treatment in a cation exchange unit so as to reduce the amount of dissolved calcium and other factors which produce hardness to a suitable level at which the effluent can be used in place of fresh water in the pulp and paper mill system of the kraft plant.

If desired one may further dewater the underflow of the clarifier used in separating the flocculated particles from the resulting liquor and thereafter recover the residual chemicals by introducing the sludge in the lime kiln but in practice it is preferably from an economic view to use the underflow from the white water clarifier for land fill purposes.

One of the advantages to the discovery that calcium carbonate may be used as an aid in flocculating the suspended solids in kraft white waters lies in the ease with which the white water reclamation procedures can be integrated in a kraft process plant and with the colored liquor reclamation procedures advocated herein. Thus it has been found that the calcium carbonate containing scrub water in the underflow of a lime kiln gas scrubber may be simply mixed with the white water in treating it with the flocculating aid. In practice it has been found that the underflow from the secondary lime kiln gas scrubber may be used for this purpose and wherein a portion of the overflow from the clarifier used in the colored liquor reclamation procedures is used as scrub water in the secondary scrubber.

In the preferred practice of the invention, at least a portion of the cation exchange effluent is passed in indirect heat exchange with blow heat condensate in the pulp mill system of the kraft plant and thereatfer used as fresh wash water in the last stage of the multistage countercurrent pulp washing unit.

In carrying out the white water reclamation procedures, it will be evident that the effluent from the white water sewer system is isolated from the other sewer systems in the plant.

In accord with a third aspect of the invention and with a view of eliminating the discharge of weak liquor from the weak liquor sewer system of kraft process plants we have found that by isolating the weak liquor sewer system and collecting the weak liquors from the pulp mill system, the soda recovery system, the lime recovery system and the chemical production system in a weak liquor pond and thereafter using the collected liquors as wash water in one of the stages between the first and last stage of the pulp washing unit that the weak liquors can not only be used in carrying out the washing procedures but that the chemical values therein can be recovered in the normal handling of the black liquor derived from the multistage pulp washing unit.

Figure 2:
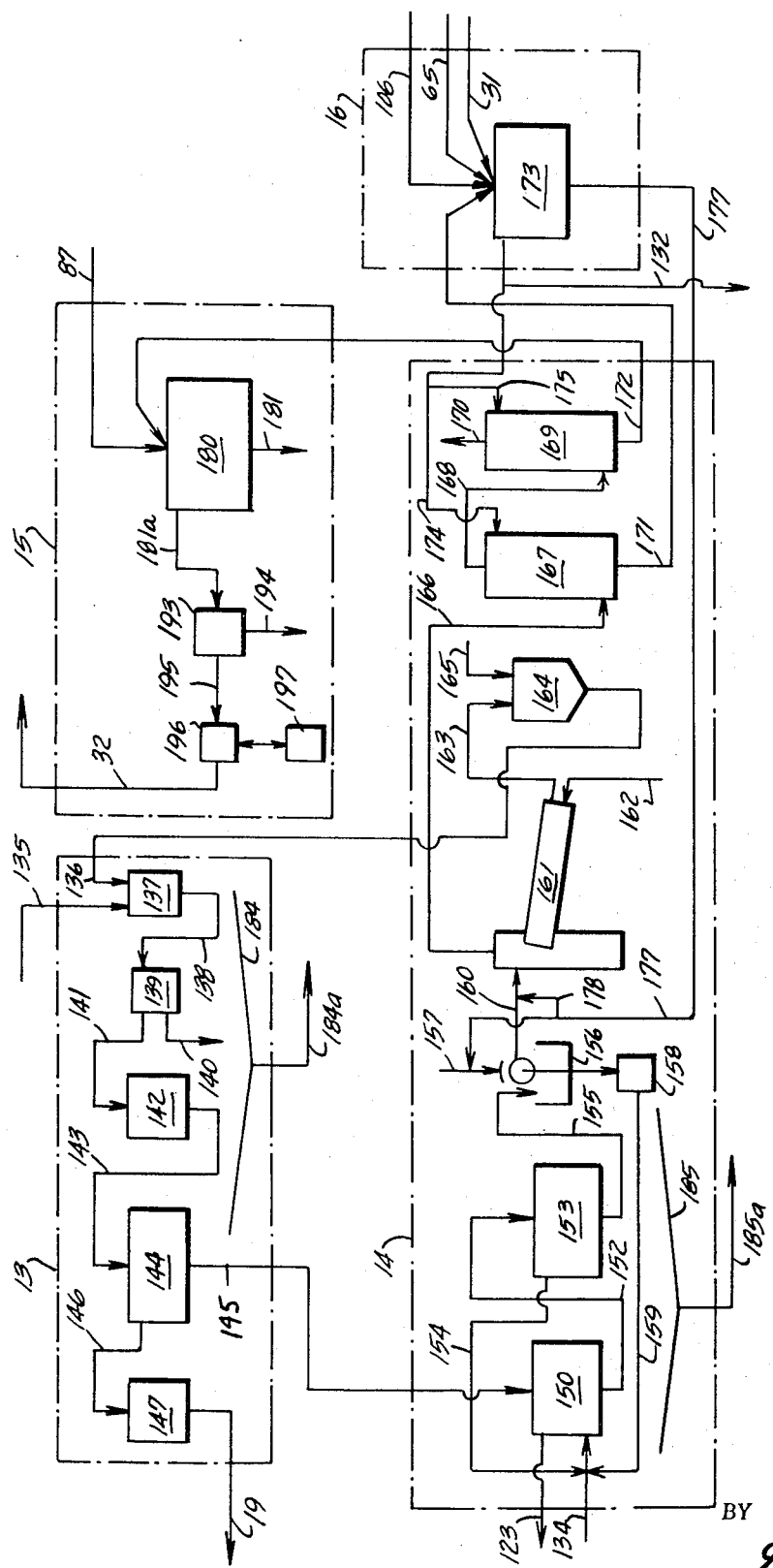

The novel features which are believed to characteristic of this invention are set forth with particularity in the appended claims. The invention, itself, however, both as to its organization and method of operation, together with further objects and advantages thereof, may best be understood by reference to the following description taken in connection with the accompanying drawings, in which:

FIG. 1 schematically illustrates the flow of material in the pulp mill, paper mill, and chemical recovery plant systems of a kraft pulp and paper process plant as modified in accord with the invention herein, and FIG. 2 schematically illustrates the flow of material in the white liquor production and lime recovery systems of a kraft pulp and paper process plant as modified by the white water reclamation and colored liquor reclamation systems advocated herein.

Reference is now made to the drawings and wherein the kraft process plant is illustrated as including a pulp mill system 10, a paper mill system 11, a soda or chemical recovery plant system 12, a white liquor production system 13, and a lime recovery system 14. As modified by the various aspects of the invention, the kraft plant is shown as also including a white water reclamation system 15, a colored liquor reclamation system 16, and a ponding system which includes a weak liquor pond 17 and a strong liquor pond 17a.

In the pulp mill system 10, wood is digested in a kraft liquor to dissolve its lignin content and is then transformed into a pulp which is washed and suitably prepared for use in the paper mill system 11. The wood 18, in the form of chips or shreds, is combined with white liquor 19 and recycled black liquor 20 in a digester 21. The wood is then subjected to digesting conditions at elevated temperatures and pressures by the admission of live steam 22 to the digester and after a suitable digestion period, the pressure in the digester is relieved so that the digester content 23 is blown in to a blow tank 24 and whereat the pulp formed during the digester blow is collected. The vapors 25 which are formed as the digester is blown are passed to a condensor tank 26 of the blow heat recovery unit 27 and the noncondensable gases are normally removed from tank 26 as indicated by arrow 28. The blow heat condensate which is recovered in tank 26 is then circulated through a heat exchanger 29 as indicated by lines 30 and the excess condensate 31 which is normally bled-off and discharged as a waste effluent in most kraft plants is passed to the colored liquor reclamation system 16 and treated as indicated hereinafter. The heat content of the blow heat condensate is recovered in the heat recovery unit 27 by passing at least a portion of the reclaimed white water 32 derived from the white water reclamation system 15 through the coils of exchanger 29 and thus in indirect heat exchange with the blow heat condensate which is circulated through the heat exchanger 29. At least a portion 33 of the heated reclaimed white water is then passed as fresh water to the last stage of the countercurrent pulp washing unit 41 and with the balance 34 of the heat exchanger discharge being passed throughout the kraft plant for use as hot mill water.

The pulp recovered in the blow tank 24 is normally combined with recycled black liquor as indicated by line 20a and which is used in transporting the pulp from the blow tank 24 to a fibrillizer or breaker 36 where it is mechanically broken up and then passed as by line 37 to screens 38. Here the knots and oversized material 39 are removed and usually sent back to the digesters while the screened pulp 40 is transported to the countercurrent multistage pulp washing unit 41. Unit 41 is shown in the drawings as comprising four washing stages which are designated at 42, 43, 44 and 45 respectively. Each stage is equipped with an appropriate filtrate tank and these tanks are designated at 42a, 43a, 44a and 45a respectively. The screened pulp 40 passes successively through the stages of the washing unit 41 and from the first stage 42 to the fourth stage 45 passes as indicated by lines 46. From the last or fourth stage 45 of unit 41, the washed pulp 47 is then passed to the washed stock tank designated at 48. As is customary in countercurrent washing procedures that are used in kraft process plants, the filtrates from the second stage 43 and subsequent stages in the washing unit are withdrawn from the filtrate tanks and passed countercurrent to the flow of the pulp by appropriate conduits 49 to the wash water showers in the preceding stages. In the embodiment illustrated, the effluent 50 from the third stage filtrate tank 44a passes through a soap skimming tank 51 so that soap accumulations 52 may be removed from the filtrate prior to its introduction into the second washing stage 43 of unit 41. The black liquor 53 which is removed from the pulp in the washing unit 41 is withdrawn from the first stage filtrate tank 42a in normal plant practice and apart from recycled portions is sent to the chemical recovery plant system 12.

The washed stock in tank 48 is normally diluted to a suitable consistency in kraft plant practice by means of recycled pulp decker filtrate 54 and the diluted stock 55 is then delivered to the screens 56 for the removal of residual knots and oversized material 57 which may then be passed back to the digesters. The screened stock 58 is then delivered to the pulp decker 59 and whereat it is filtered and again washed with hot mill water 64 before delivery to the paper mill system 11. The filtrate from the pulp decker 59 is collected in the decker seal pit 63 and excess filtrate 65 is passed to the colored liquor reclamation system 16 and treated as indicated hereinafter.

The stock 60 from the pulp decker 59 is collected in the stock tank 68 of the paper mill system 11 and here is diluted with recycled white water 69 and then passed, as by line 70, to a stock chest 71. From the stock chest 71, the stock is then passed, as by line 72, to refiners 73 and from which the refined stock is then delivered to another stock chest 75. From chest 75, the stock 76 then normally passes to jordans 77 for further refining and from here the refined stock 78 is delivered to the head box 79 of the paper machine 66. Here at the machine 66 refined pulp is delivered from the head box 79 to the Fourdrinier wire section 80 of the machine to form a web which then passes successively through the press section 81, drier section 82 and calender section 83 of the machine 66 before being wound on the reel 84 of the machine as is well known in the art.

The white water from the machine 66 is collected in the usual white water sewer system 85 of the paper mill system 11, and a portion 86 is recycled directly to the machine as is known by those skilled in the art. To prevent solids buildup in the circulated white water, another portion 87 is continuously bled-off from the sewer system 85 while make up water 88 is added to the recycled white waters. Normal kraft plant practices, the bleed-off portion 87 with its high content of suspended pulp is discharged from the kraft plant as one of the waste effluents but in the instant case the bleed-off portion 87 of the white water is delivered to the white water reclamation system 15 and treated as indicated hereinafter.

In the chemical recovery plant system 12, black liquor received from the pulp mill system 10 is initially stored in a black liquor tank 90 and which serves as a feed tank for the multiple effect evaporation unit 92. Unit 92 is shown as having five effects, 93, 94, 95, 96 and 97, and as being arranged with a backward feed wherein the black liquor feed line 91 passes to the fifth effect 97 and the live steam 98 is admitted to the first effect 93. More or less effects in other arrangements may be used as those skilled in the art will be aware. In the illustration however, the vapors 99 from the first four effects are passed to the next effect for heat exchange purposes, and the vapors 100 from the fifth effect 97 are passed to a surface condenser 101 and wherein the vapors are condensed by being passed in indirect heat exchange with cooling water 102. The noncondensable gases 103 in the vapors 100 delivered to the condenser 101 are expelled from the condenser and the condensate 104 is collected with the condensates 105 from the five effects of unit 92 and the combined condensates 106 then pass to the colored liquor reclamation system 16 and treated therein as indicated hereinafter.

The flow of black liquor between the five effects of the evaporation unit 92 is indicated by lines 107 and wherein it will be noted that the liquor passes through a soap skimming tank 108 between the second and third effects so that soap 109 may be removed.

The concentrated black liquor 110 which is recovered from the first effect of the evaporation unit 92 is collected in normal plant procedures in a heavy liquor tank 111 and in the usual kraft process plant is passed, as indicated by line 112, to a direct contact evaporator 113. Here the combustion products 114 from the soda recovery furnace 115 are passed into direct contact with the heavy liquors to effectuate further concentration of the liquor. The effluent gaseous products of combustion 116 which are derived from evaporator 113 usually pass through an electrostatic precipitator 117 and from which entrained particles 118 are removed.

The heavy liquor underflow 119 from evaporator 113 is then passed to the recovery furnace 115 and is here burned with make up salt cake 120 through the addition of a suitable fuel-air mixture 121. The smelt 122 derived from the furance 115 is then combined in a dissolving tank 124 with lime mud washer overflow 123 that is derived from the lime recovery system 14. The residue containing green liquor 125 obtained by dissolving the melt 122 in the washer overflow 123 is then passed to a clarifier 126 from which the dregs or residues 127 are removed as the underflow while the clarified green liquor overflow 128 is collected in a green liquor storage tank 129.

Insofar as the vapor containing gaseous products of combustion that are derived from the electrostatic precipitator 117 are concerned, these gases 130 are then passed in most kraft process plants to a soda recovery furnace gas scrubber 131 and wherein they are passed countercurrent to scrub water 132. As will be subsequently seen, a portion of the clarified colored liquor derived from the colored liquor reclamation system 16 is used for scrubbing the gaseous products of combustion in scrubber 131. The scrubbed gases 133 from scrubber 131 are normally expelled to the atmosphere while the underflow 134 is passed as wash water to a lime mud washer in the lime recovery system 14.

The green liquor 135 which is derived from storage tank 129 is transformed into white liquor in the white liquor production system 13 of the kraft process plant and is initially mixed in a lime slaker tank 137 with lime 136 which is recovered in the lime recovery system 14 of the kraft process plant. The underflow 138 from the slaker tank 137 is then normally passed to a classifier 139 for separation of the dregs and oversized solids components 140 while the overflow 141 from the classifier 39 is passed to a causticizer tank 142 that provides a residence time sufficient for completion of the causticizing reaction. The liquor and entrained solids from the causticizer tank 142 are then passed, as by means of line 143, to a clarifier 144. Here the lime mud is removed as the underflow 145 while the clarified product of the causticization reaction is passed to a white liquor storage tank 147 as by line 146 for storage until subsequent use in the digesters of the pulp mill system 10.

The calcium carbonate product of the cauticizing reaction is recovered as burnt lime in the lime recovery system 14. Here the underflow 145 from clarifier 144 is passed counter-current to wash water in a lime mud washer 150. The washed mud is then recovered in the underflow 152 of the washer 150 and is passed to a thickener 153 and from which the underflow 155 is then passed to a lime mud filter 156. As in normal plant practice the overflow 154 from thickener 153 and the filtrate 159 derived from the filtrate tank 158 of filter 156 are returned as wash water to the lime mud washer 150 and are shown in FIG. 2 as being combined with the underflow 134 from scrubber 131 for this purpose.

In filter 156 the lime mud forms a cake on the drum of the filter and the cake is washed in normal plant practice with wash water which is normally passed to the filter showers as indicated by line 157. As will be subsequently seen, the underflow from the clarifier used in reclaiming the colored liquors contains calcium carbonate used in the treatment of the colored liquors and also contains colloidal particles which have been separated from the treated colored liquors. This underflow 177 in accord with certain aspects of the procedures followed in reclaiming the colored liquors is passed to the showers of filter 156 as by being combined with the wash water in line 157 so that the colloidal particles are trapped in the interstices between the calcium carbonate particles of the filter cake and then passed with the filtered lime mud as by line 160 to the lime kiln 161 of the recovery system 14. Alternatively, all or a portion of the undeflow 177 may be passed directly to the lime kiln 161 as indicated by line 178 although this is less desirable because of the additional evaporation load imposed upon the lime kiln 161.

In the lime kiln the separated colloidal particles derived from the colored liquor reclamation system 16 are burned as the lime mud is calcined by the combustion of a suitable fuel-air mixture 162 in the kiln. The calcined product from the lime kiln 151 is then, in normal kraft plant practice, passed to a storage tank 164 to which make up lime 165 may also be added. Tank 164 serves as a storage tank for the lime 136 to be used in the causticizing reaction which transpires in the white liquor production system 13.

The gaseous products derived by the combustion of fuel-air mixture 162 in kiln 151 together with entrained lime particles and the carbon dioxide product of the calcination reaction are then passed to a primary lime kiln gas scrubber 167 as indicated by line 166. In the primary scrubber 167 the gases are passed countercurrent to the scrub water used in the scrubber and the gaseous effluent 168 from the scrubber 167 is then passed to a secondary lime kiln gas scrubber 169 and wherein the gases are again passed in countercurrent flow relation to scrub water and with the effluent 170 of scrubber 169 being normally expelled to the atmosphere.

In usual kraft process plant practices, the calcium carbonate containing scrub waters in the underflows 171 and 172 of the primary and secondary gas scrubbers are usually returned to the lime mud washed 150 as wash water but as will be seen hereafter these underflows are utilized in certain aspects of the procedures followed in treating the colored liquors and white water in the reclamation system 16 and 15 respectively.

In reclaiming the colored liquors in the embodiment illustrated, the blow heat condensate 31, the pulp decker filtrate 65 and the condensates 106 derived from the avaporation unit are combined and treated in a clarifier 173 with the calcium carbonate contained in the scrub water recovered in the underflow 171 from the primary lime kiln gas scrubber 167. As previously indicated the calcium carbonate serves as an aid to the flocculation of the colloidal particles in the colored liquors that are thus combined in the clarifier 173. The thus treated liquor is then permitted to clarify by settling procedures in the clarifier 173 and the flocculated particles are separated from the resulting clarified liquor and recovered as a sludge in the underflow 177 from the clarifier 173. This calcium carbonate containing sludge and which also contains the separated flocculated particles is then passed to a lime recovery system 14 and wherein the calcium carbonate is recovered and burned in the lime kiln 161 along with the colloidal organic particles as previously indicated.

The clarified colored liquor recovered in the overflow from clarifier 173 is then used as scrub water for scrubbing the combustion gases derived from the recovery furnace and the lime kiln in the embodiment illustrated. In this respect, a portion of the clarified liquor is passed as scrub water 132 to the gas scrubber 131 used in the chemical recovery plant system 12 and by passing the underflow 134 from this scrubber 131 to a lime mud washer 150 in system 14 and in using it as wash water in the washer a portion of the aqueous component of the normally wasted colored liquor effluent from the kraft process plant is recovered and reintroduced into the plant process. In the embodiment illustrated yet another portion of the clarified liquor recovered in the overflow from clarifier 173 is passed as scrub water 174 to the primary lime kiln gas scrubber 167. This portion is thereafter recovered in the underflow 171 from the primary scrubber 167 and recycled to clarifier 173 and wherein it is mixed in the continuous process with the colored liquors that are fed to the clarifier so as to treat the liquors with the calcium carbonate which is recovered in the scrubbing procedure that transpires in scrubber 167. Yet another portion of the clarified liquor in the overflow from clarifier 173 is passed as scrub water 175 to the secondary lime kiln gas scrubber 169 in the embodiment illustrated. This portion of the clarified liquor is recovered in the underflow 172 from the scrubber and together with the residual calcium carbonate which is picked up during the scrubbing procedure is then passed to the white water reclamation system 15. In treating the colored liquors with calcium carbonate it will be appreciated by those skilled in the art that the clarified liquor recovered has a high hardness content which would prevent its direct use in indirect heat exchange equipment employed in the pulp mill and chemical recovery plant systems of the kraft process plant and consequently the overflow from clarifier 173 is admirably suited for use as scrub waters in the various scrubbers and wherein scaling is not a prime consideration in the operation of the equipment.

In the preferred practice of the embodiment illustrated, the overflow from clarifier 173 is so divided among the three scrubbers 167, 169 and 131 that the underflow 171 from primary scrubber 167 contains sufficient calcium carbonate to provide optimum treatment of the colored liquors fed to the clarifier 173. As previously indicated, the amount of calcium carbonate employed in treating the colored liquors is such as to provide a weight ratio of calcium carbonate to BOD value of the liquor treated of between 30:1 and 50:1 under optimum conditions. Actual plant tests indicate that as much as 85% of the BOD value of the colored liquors may be removed under optimum conditions and have indicated surprisingly that an average color unit reduction of about 85% may also be realized. It may be well at this point to point out that the BOD value as used herein has reference to the biochemical oxygen demand value of the liquors involved and as determined by the procedures set forth on pages 415 to 421 of Standard Methods for the Examination of Water and Waste Water, Twelfth Edition (1965), and which is published jointly by the American Public Health Association, the American Waterworks Association and Water Pollution Control Federation. The methods for determining and reporting color values will be found on pages 127 to 129 of this reference.

In reclaiming the white water in the embodiment depicted in the drawings, the bleed-off white water 87 from the white water sewer system 85 is treated with calcium carbonate in a clarifier 180 by mixing the underflow 172 from the secondary scrubber 169 with the white water added to the clarifier 180. The calcium carbonate in this instance also serves as an aid to the flocculation of the suspended solids particles in the white water added to the clarifier and in carrying out the white water reclamation procedure the treated white water is subjected to clarification by settling procedures in the clarifier 180 and the flocculated solids particles are separated from the clarified resulting liquor as a sludge in the underflow 181 from the clarifier 180. The clarified liquor is recovered in the overflow 181a from the clarifier and then passed to a carbon or other suitable filter 193 for the separation of the residual suspended material 194 which is carried through with the overflow 182 from clarifier 180. The sludge 181 and residual suspended material 194 that is removed in filter 193 are discarded as waste material and preferably used for land fill purposes in the embodiment illustrated although it is within the purview of this aspect of the invention to further dewater the underflow 181 as by centrifuging procedures and thereafter recover the lime content in the lime recovery system 14 by passing the recovered solids materials to the lime kiln 161.

Filter 193 serves primarily to remove the residuals suspended material from the thus clarified white water prior to its passage to a cation exchange unit 196 and wherein the residual suspended material would otherwise tend to clog the unit as is well known in the art. The filtrate 195 from the filter 193 is passed through the cation exchange unit 196 to reduce the hardness content to a suitable level at which the effluent 32 may be passed through indirect heat exchange equipment in the pulp mill and/or chemical recovery plants systems without excessive scale formations. Any suitable cation exchange material may be used in unit 196 as will be apparent to those skilled in the art and the unit 196 is seen in FIG. 2 as connected to a suitable regeneration unit 197 for regenerating the cation exchange material employed in the cation exchange unit 196.

The weak liquor sewer system for the kraft process plant includes the sewer system 182 for the pulp mill system 10, the sewer system 183 for the chemical recovery plant system, the sewer system 184 for the white liquor production system 13, and the sewer system 185 for the lime recovery system 14. In line with avoiding the discharge of the sewers waters from the weak liquor sewer system 182 through 185 inclusive as waste plant effluents, these sewer systems are isolated from the white water sewer system 85 and the sewer waters 182a, 183a, 184a and 185a from systems 182, 183, 184 and 185 respectively are continuously collected in a weak liquor pond 17. Thereafter the collected liquors are introduced as wash water into one of the stages between the first stage 42 and last stage 45 of the pulp washing unit 41 as is illustrated in FIG. 1 by the delivery of the weak liquor to the third stage filtrate tank 44a by line 186. The sewer waters derived from sewer systems 182 through 185 inclusive because of their low chemical content may be used in washing the black liquor from the pulp and unit 41 and thus reduce the amount of wash water which is normally added to the unit 41 and simultaneously the chemical values in the weak liquors can then be recovered in a normal treatment of the black liquor in the soda recovery plant system 12.

The ponding system shown in FIG. 1 also includes a strong liquor pond 17a. Pond 17a is connected to the black liquor tank 90 as by line 187 so that when the evaporator unit 92 is shut down under emergency conditions, the black liquor from tank 90 may be diverted through line 187 to the strong liquor pond 17a and thereafter pumped back to the black liquor tank 90 when the unit 92 is again activated. Similarly pond 17a is connected to the heavy liquor tank 111 as by line 188 so thta when the recovery furnace 115 is shut down excess heavy liquor which accumulates from the continued operation of the evaporation unit 92 may be diverted to the strong liquor pond 17a through line 188 and thereafter returned to the heavy liquor tank 111 through line 188 when furnace 115 is again activated or alternatively returned through line 187 to the black liquor tank 90.

While only certain preferred embodiments of this invention have been shown and described by way of illustration, many modifications will occur to those skilled in the art and it is, therefore, desired that it be understood that it is intended herein to cover all such modifications as fall within the true spirit and scope of this invention.

What is claimed as new and what it is desired to secure by Letters Patent of the United States is:

1. In a kraft pulp and paper process plant that includes a lime recovery system having a lime kiln, the method of reclaiming effluent color liquor containing dissolved lignin comprising the steps of:
   (a) treating the colored liquor with calcium carbonate in a weight ratio of $CaCO_3$ to liquor BOD value of between 20:1 and 80:1 to flocculate colloidal particles in the colored liquor,
   (b) clarifying the treated colored liquor by settling and separating the flocculated particles from the treated colored liquor,
   (c) burning the separated colloidal particles in the lime kiln, and
   (d) scrubbing lime kiln effluent gaseous combustion products with at least a portion of the clarified treated colored liquor.

2. In a kraft pulp and paper process plant that includes a lime recovery system having a lime kiln and a primary lime kiln gas scrubber, the method in accord with claim 1 where the colored liquor treating step comprises mixing the colored liquor with calcium carbonate containing scrub water derived from primary lime kiln gas scrubber underflow.

3. In a kraft pulp and paper process plant that includes a lime recovery system having a lime kiln and a lime mud washer, and a chemical recovery system having a soda recovery furnace, the method in accord with claim 1 which comprises the further steps of:
   (e) scrubbing gaseous combustion products derived from the soda recovery furnace in a furnace gas scrubber with a portion of the clarified treated colored liquor derived from the clarifying step, and
   (f) passing furnace gas scrubber underflow as wash water to the lime mud washer.

4. In a kraft pulp and paper process plant that includes a lime recovery system having a lime kiln and a lime mud filter, the method in accord with claim 1 which comprises the further steps of:
   (e) spraying the separated colloidal particles onto the filter cake in the lime mud filter prior to the burning step.

5. In a kraft pulp and paper process plant that includes a lime recovery system having a lime kiln, a primary lime kiln gas scrubber, a secondary lime kiln gas scrubber, a lime mud washer and a lime mud filter, and a chemical recovery system having a soda recovery furnace gas scrubber, the method of reclaiming effluent colored liquor containing dissolved lignin comprising the steps of:
   (a) treating colored liquor that includes evaporator condensate, blow heat condensate and pulp decker filtrate with calcium carbonate in a weight ratio of $CaCO_3$ to BOD value in the liquor treated of between 20:1 and 80:1 to flocculate colloidal particles in the liquor treated,
   (b) clarifying the treated colored liquor by settling and separating the flocculated particles from the treated colored liquor,
   (c) spraying the separated particles onto the filter cake in the lime mud filter,
   (d) subsequently burning the separated particles in the lime kiln,
   (e) passing respective portions of the clarified treated colored liquor as scrub waters to the soda recovery furnace gas scrubber, the primary lime kiln gas scrubber and the secondary lime kiln gas scrubber, and
   (f) passing soda recovery furnace gas scrubber underflow as wash water to the lime mud washer the colored liquor treating step comprising mixing the colored liquor with calcium carbonate containing scrub water derived from underflow of the primary lime kiln gas scrubber.

6. In a kraft pulp and paper process plant that includes a pulp mill system, the method of reclaiming effluent white water comprising the steps of:
   (a) treating the white water with calcium carbonate in a weight ratio of $CaCO_3$ to suspended solids in the white water of between 0.5:1 and 10:1 to flocculate suspended solids particles in the white water,
   (b) clarifying the treated white water by settling and separating flocculated solids particles from the treated white water,
   (c) filtering the clarified treated white water to separate residual suspended material,
   (d) passing the filtrate from the filtering step through a cation exchange unit to remove hardness factors from the filtrate, and
   (e) passing effluent of the cation exchange unit to the pulp mill system.

7. In a kraft pulp and paper process plant that includes a pulp mill system, and a lime recovery system having a lime kiln gas scrubber, the method in accord with claim 6 where the white water treating step comprises mixing the white water with calcium carbonate containing scrub water derived from underflow of the lime kiln gas scrubber.

8. In a kraft pulp and paper process plant that includes a pulp mill system, and a lime recovery system having a primary lime kiln gas scrubber and a secondary lime kiln gas scrubber, the method in accord with claim 6 where the white water treating step comprises mixing the white water with calcium carbonate containing scrub water derived from underflow of the secondary lime kiln gas scrubber.

9. In a kraft pulp and paper process plant that includes a pulp mill system, a lime recovery system having a lime kiln, a lime mud washer, a primary lime kiln gas scrubber and a secondary lime kiln gas scrubber, and a chemical recovery system having a soda recovery furnace gas scrubber, the method of reclaiming effluent colored liquor containing dissolved lignin and of reclaiming effluent white water comprising:
 (a) treating the colored liquor with calcium carbonate in a weight ratio of calcium carbonate to liquor BOD value of between 30:1 and 50:1 to flocculate colloidal particles in the colored liquor,
 (b) clarifying the treated colored liquor by settling and separating the flocculated colloidal particles from the treated colored liquor,
 (c) burning the separated colloidal particles in the lime kiln,
 (d) passing respective portions of the clarified treated colored liquor as scrub waters to the soda recovery furnace gas scrubber, the primary lime kiln gas scrubber and the secondary lime kiln gas scrubber,
 (e) passing furnace gas scrubber underflow as wash water to the lime mud washer,
 (f) treating the white water with calcium carbonate in a weight ratio of $CaCO_3$ to suspended solids in the white water of between 3:1 and 7:1 to suspended solids particles in the white water,
 (g) clarifying the treated white water by settling and separating flocculated solids particles from the treated white water,
 (h) filtering the clarified treated white water to separate residual suspended material therefrom,
 (i) passing the filtrate from the filtering step through a cation exchange unit to remove hardness factors from the filtrate, and
 (j) passing effluent of the cation exchange unit to the pulp mill system;
the colored liquor treating step comprising mixing the colored liquor with calcium carbonate containing scrub water derived from underflow of the primary lime kiln gas scrubber, and the white water treating step comprising mixing the white water with calcium carbonate containing scrub water derived from under flow of the secondary lime kiln gas scrubber.

10. In a kraft pulp and paper process plane which includes a chemical recovery system, a lime recovery system, a white liquor production system and a pulp mill system that has a countercurrent multistage pulp washing unit, and which further includes a plant weak liquor sewer system, the method of reclaiming weak liquor from the plant weak liquor sewer system and of reclaiming effluent white water comprising the steps of:
 (a) collecting weak liquor sewer waters from the pulp mill system, the chemical recovery system, the lime recovery system, and the white liquor production system in a weak liquor pond,
 (b) passing the collected weak liquor sewer waters as wash water to a pulp washing stage which is between the first and last pulp washing stages of the multistage pulp washing unit,
 (c) treating the white water with calcium carbonate in a weight ratio of $CaCO_3$ to suspended solids in the white water of between 0.5:1 and 10:1 to flocculate the suspended solids particles in the white water,
 (d) clarifying the treated white water by settling and separating flocculated solids particles from the treat- white water,
 (e) filtering the clarified treated white water to separate residual suspended material therefrom,
 (f) passing the filtrate from the filtering step through a cation exchange unit to remove hardness factors from the filtrate,
 (g) passing at least a portion of the cation exchange unit effluent in indirect heat exchange with blow heat condensate to heat the effluent portion, and
 (h) passing at least a portion of the heated cation exchange unit effluent as wash water to the last pulp washing stage of the multistage pulp washing unit.

11. In a kraft pulp and paper process plant which includes a chemical recovery system, a lime recovery system that has a secondary lime kiln gas scrubber, a white liquor production system, and a pulp mill system that has a countercurrent multistage pulp washing unit, and which further includes a plant weak liquor sewer system, the method in accord with claim 10 where the white water treating step comprises mixing the white water with calcium carbonate containing scrub water derived from underflow of the secondary lime kiln gas scrubber.

12. In a kraft pulp and paper process plant which includes a lime recovery system that has a lime kiln, a lime mud washer, a primary lime kiln gas scrubber and a secondary lime kiln gas scrubber, a paper mill system, a pulp mill system that has a countercurrent multistage pulp washing unit, a chemical recovery system that has a soda recovery furnace gas scrubber, and a white liquor production system, and which further includes a plant weak liquor sewer system, the method of reducing waste effluents comprising the continuous steps of:
 (a) treating colored liquor that includes evaporator condensate, blow heat condensate and pulp decker filterate with calcium carbonate in a weight ratio of $CaCO_3$ to liquor BOD value of between 30:1 and 50:1 to flocculate colloidal particles in the colored liquor,
 (b) clarifying the treated colored liquor by settling and separating the flocculated particles from the treated colored liquor,
 (c) passing respective portions of the clarified treated colored liquor as scrub waters to the recovery furnace gas scrubber, the primary lime kiln gas scrubber and the secondary lime kiln gas scrubber,
 (d) passing furnace gas scrubber underflow as wash water to the lime mud washer,
 (e) treating white water effluent from the paper mill system with calcium carbonate in a weight ratio of $CaCO_3$ to suspended solids in the white water of between 3:1 and 7:1 to flocculate the suspended solids particles therein,
 (f) clarifying the treated white water by settling and separating flocculated solids particles from the treated white water,
 (g) burning the particles separated in the treated white water and colored liquor clarifying steps in the lime kiln,
 (h) filtering the clarified treated white water to separate residual suspended material therefrom,
 (i) passing filtrate from the filtering step through a cation exchange unit to remove hardness factors from the filtrate,
 (j) collecting weak liquor sewer waters from the pulp mill system, the chemical recovery system, the lime recovery system and the white liquor production system in a weak liquor pond,
 (k) passing the collected weak liquor sewer waters as wash water to a pulp washing stage which is between the first and last pulp washing stages of the multistage pulp washing unit,
 (l) passing at least a portion of the cation exchange unit effluent in indirect heat exchange with blow heat condensate to heat the cation exchange effluent portion, and
 (m) passing at least a portion of the heated cation exchange unit effluent as wash water to the last pulp washing stage of the multistage pulp washing unit; the colored liquor treating step comprising mixing the colored liquor with calcium carbonate containing scrub water derived from underflow of the primary lime kiln gas scrubber, and the white water treating step comprising mixing the white water with calcium carbonate containing scrub water derived from underflow of the secondary lime kiln gas scrubber.

References Cited

UNITED STATES PATENTS

| 2,360,779 | 10/1944 | Lang et al. | 162—60 |
| 3,294,623 | 12/1966 | Brinkley et al. | 160—60 X |
| 3,454,970 | 7/1969 | Sutherland | 162—60 X |
| 1,880,972 | 10/1932 | Munroe et al. | 162—190 X |
| 2,771,823 | 11/1956 | Lukemire | 162—190 |
| 2,801,264 | 7/1957 | Thomsen | 162—38 X |
| 3,366,535 | 1/1968 | Cann | 162—30 |

FOREIGN PATENTS 984,182  2/1965  Great Britain.

OTHER REFERENCES

Pulp & Paper Manufacture, vol. 4, McGraw-Hill, p. 618.

S. LEON BASHORE, Primary Examiner
A. CORBIN, Assistant Examiner

U.S. Cl. X.R.

23—48, 49, 66; 162—38, 40, 41, 42

UNITED STATES PATENT OFFICE
CERTIFICATE OF CORRECTION

Patent No. 3,666,619             Dated  May 30, 1972

Inventor(s)  Joseph E. Mailhos and Gerald P. Delaune

It is certified that error appears in the above-identified patent and that said Letters Patent are hereby corrected as shown below:

Column 8, line 27, the numeral "39" should read -- 139 --
Column 9, line 5, the numeral "151" should read -- 161 --
Column 11, line 31, "thta" should be -- that --
Column 12, line 40, after "washer" insert a semi-colon -- ; --
Column 13, line 28, after "7:1 to" insert -- flocculate --

Signed and sealed this 19th day of December 1972.

(SEAL)
Attest:

EDWARD M. FLETCHER, JR.                    ROBERT GOTTSCHALK
Attesting Officer                          Commissioner of Patents